United States Patent
Kobayashi et al.

(10) Patent No.: US 6,188,972 B1
(45) Date of Patent: Feb. 13, 2001

(54) INTEGRATING DEVICE AND INTEGRATING METHOD

(75) Inventors: Masakazu Kobayashi, Saitama; Yoshihito Nakamura, Kanagawa, both of (JP)

(73) Assignees: Kansei Corporation, Saitama; Kabushiki Kaisha Toshiba, Kanagawa, both of (JP)

( * ) Notice: Under 35 U.S.C. 154(b), the term of this patent shall be extended for 0 days.

(21) Appl. No.: 09/173,169

(22) Filed: Oct. 15, 1998

(30) Foreign Application Priority Data

Oct. 15, 1997 (JP) .................................... 9-282384

(51) Int. Cl.⁷ ........................................ G06F 15/20
(52) U.S. Cl. .................... 702/165; 702/149; 701/35; 340/438
(58) Field of Search .................... 702/165, 85, 149; 701/29–31, 35, 123; 340/438, 441

(56) References Cited

U.S. PATENT DOCUMENTS

| | | | | |
|---|---|---|---|---|
| 4,176,397 | * | 11/1979 | Crom et al. | 702/165 |
| 4,409,663 | * | 10/1983 | Becker et al. | 702/165 |
| 4,755,832 | * | 7/1988 | Gulas et al. | 346/33 R |
| 5,337,236 | * | 8/1994 | Fogg et al. | 701/35 |
| 5,893,893 | * | 4/1999 | Holt et al. | 701/35 |
| 6,044,315 | * | 3/2000 | Honeck et al. | 701/35 |

FOREIGN PATENT DOCUMENTS 6-241825  9/1994  (JP) ................................ G01C/22/00

* cited by examiner

Primary Examiner—Marc S. Hoff
Assistant Examiner—Hien Vo
(74) Attorney, Agent, or Firm—Sughrue, Mion, Zinn, Macpeak & Seas, PLLC

(57) ABSTRACT

An integrating device includes: a non-volatile memory for storing a value of an integrated running distance of a vehicle; an arithmetic processor for calculating a new integrated running distance by a signal generated at each predetermined running distance and also by the integrated running distance stored in the non-volatile memory; and a display unit for displaying the integrated running distance. The non-volatile memory stores a positive value lower than a predetermined reference value as an initial value of the integrated running distance, and the arithmetic processing means outputs a value obtained when the predetermined reference value is subtracted from the integrated running distance, to the display means as the integrated running distance in the case where a value of the integrated running distance stored in the non-volatile memory is not less than the predetermined reference value.

4 Claims, 3 Drawing Sheets

| VALUES STORED IN MEMORY | DISPLAYED VALUE |
|---|---|
| 0 | 0Km |
| 1 | 1 |
| ≀ | ≀ |
| 999,999 | 999,999 |
| 1,000,000 | 0 |
| 1,000,001 | 1 |
| ≀ | ≀ |
| 1,999,999 | 999,999 |
| 2,000,000 | 999,999 |
| 2,000,001 | 999,999 |
| ≀ | ≀ |

INTEGRATING DEVICE AND INTEGRATING METHOD

BACKGROUND OF THE INVENTION

1. Field of the Invention

The present invention relates to an integrating device for integrating a running distance of a vehicle. More particularly, the present invention relates to an integrating device for displaying an integrated value obtained when only a running distance after the delivery of a vehicle is integrated.

2. Description of the Related Art

Usually, an odometer, which is an integrating device for integrating a running distance of a vehicle, is incorporated into a vehicle such as an automobile. In an electronic type odometer, an integrated value of a running distance is stored in a non-volatile memory such as EEPROM.

In the case where the integrated value is stored in the non-volatile memory, this integrated value is set at 0 km (kilometer) in many cases when the odometer is delivered. In this case, in the final manufacturing process of the odometer, a pseudo pulse signal is inputted into the odometer instead of a pulse signal to be detected synchronously with the rotation of an axle, and it is inspected whether or not an appropriate integrated running distance is displayed on the odometer in accordance with the number of input pulses. Further, a running test is conducted by a car manufacturer on a vehicle into which the odometer is incorporated.

However, when the integrated value is set at 0 km in the delivery of the odometer, the following problem may be encountered. As described above, the running test is conducted by a car manufacturer on the vehicle into which the odometer is incorporated. Therefore, when the vehicle is delivered to a user, the integrated value is not 0 km. Accordingly, it is difficult to display an actual running distance of the user on the odometer. In order to avoid the above problems in which the integrated value is increased by various tests conducted on the vehicle, for example, it is possible to take countermeasure in which the integrated value is set at a negative value. However, in the electronic odometer, from the viewpoint of structure, it is difficult to design it in such a manner that the integrated value can be preset at a negative value.

As another method of displaying the actual integrated running distance of a user, there is provided a method in which the odometer is equipped with a function of resetting the integrated value at 0 km after the completion of the test. Therefore, as disclosed in Japanese Unexamined Patent Publication No. 6-241825, they developed an odometer having a reset mechanism by which contents of the non-volatile memory can be reset.

FIG. 4 is an arrangement view showing an odometer which is the conventional integrating device. In FIG. 4, reference numeral 101 is a distance sensor for generating a pulse signal at each predetermined running distance being linked with an axle of a vehicle. In this connection, as the frequency of this pulse signal is proportional to a vehicle speed, it is possible to use the output signal as a vehicle speed pulse. Reference numeral 102 is an arithmetic processing section. This arithmetic processing section 102 includes: a distance arithmetic means 121 for calculating a running distance of a vehicle by counting the number of pulse signals supplied from the distance sensor 101; and a control means for sending and transmitting an integrated value and others among the distance arithmetic means 121, the non-volatile memory 2 and the driver 3 arranged in the display section 104.

Reference numeral 2 is a non-volatile memory such as EEPROM for which no power source for backup is required. Reference numeral 104 is a display section, which includes: a display unit 4 for displaying an integrated running distance by utilizing a liquid crystal or a fluorescent tube; and a driver 3 for controlling the display unit 4.

Reference numeral 105 is a reset control means. The reset control means 105 resets contents of memory stored in the non-volatile memory 2 when a reset input signal is supplied by the reset mechanism 106 such as a reset input terminal arranged in a portion on a circuit substrate used for the odometer.

Next, operation will be explained as follows.

When an ignition switch is turned on and electric power is supplied, the control means 122 in the arithmetic processing section reads out an integrated value of a running distance stored in the non-volatile memory 2 and presets the integrated value in the distance arithmetic means 121. By the distance arithmetic means 121, a distance corresponding to the pulse signal supplied from the distance sensor 101 is successively integrated to the integrated value in the distance arithmetic means 121. At the same time, by the distance arithmetic means 121, an integrated value to which a new distance is integrated is outputted to the control means 122.

The control means 122 outputs the value to the driver 3 in the display section 104. At the same time, the value is stored as a new integrated value in the non-volatile memory 2, so that the integrated value is updated. The driver 3 in the display section 104 displays a value, which is supplied from the control means 122, on the display unit 4.

In this connection, the non-volatile memory 2 continues to hold its memory contents even after the power source is turned off. Therefore, when the power source is turned on next time, it is possible for the control means 122 to read out the integrated value stored last time.

In this way, the integrated value is calculated and stored in the non-volatile memory appropriately.

On the other hand, when a predetermined signal is sent from the reset mechanism 106 to the reset control mechanism 105, it is possible to reset the memory contents (integrated value) of the non-volatile memory 2 and set the integrated value at 0. When the reset control means 105 and the reset mechanism 106 are arranged as described above, the integrated value can be set at 0, for example, after the test running has been completed. Due to the foregoing, it becomes possible to display the integrated value of an actual running distance after the vehicle has been delivered to a user.

Since the conventional integrating device is composed as described above, the following problems may be encountered. There is a possibility of an unfair operation such as reducing the integrated value of the running distance conducted by a user when the user operates the reset mechanism 106. Accordingly, it becomes difficult to find a precise running distance of a vehicle.

In this connection, it is possible to employ an arrangement of the odometer in which the reset mechanism 106 is arranged in a portion on the circuit substrate of the odometer so that it becomes difficult to recognize the existence of the reset mechanism 106 in the appearance of the odometer. However, even if the above arrangement is adopted, when a user finds out the existence of the reset mechanism 106, the integrated running distance is changed by the user, for example, when the odometer is detached from the vehicle and the reset mechanism 106 is operated by the user. Further, it is possible to employ an arrangement of the odometer in which the reset mechanism 106 is composed of a plurality of switches and the operation of the reset switches are encoded by utilizing a combination of ON/OFF of the switches. However, this arrangement has the following disadvantages. When the number of switches is increased, the size of the apparatus is necessarily increased. When the number of switches is decreased, operation of the reset switches is easily decoded.

Further, the following problems may be encountered in the conventional integrating device. It is possible to consider that when the integrated value has reached a previously determined maximum value (for example, 999,999 km), the integrated value is returned to 0 in the next counting operation. In this case, there is a possibility of an unfair operation in which the integrated running distance is made to reach the maximum value again so that the integrated running distance can be returned to 0.

SUMMARY OF THE INVENTION

The present invention has been accomplished to solve the above problems, and therefore an object of the present invention is to provide an integrating device characterized in that: when an integrated value stored in the non-volatile memory is increased to a value not less than a predetermined reference value, a value obtained when the reference value is subtracted from the integrated value is displayed as an integrated running distance, so that it becomes possible to display the integrated value of an actual running distance of a user; and also it becomes possible to suppress an unfair operation conducted on the integrated running distance by the user after the vehicle has been delivered to the user.

It is another object of the present invention to provide an integrating device characterized in that: when the integrated value stored in the non-volatile memory 2 reaches the second reference value, the value of the integrated running distance is fixed, so that an unfair operation can be suppressed in which the integrated running distance is returned to 0 by increasing the integrated running distance to the previously set maximum value again.

The present invention provides an integrating device in which the non-volatile memory stores a positive value lower than a predetermined reference value as an initial value of the integrated running distance, and the arithmetic processing means outputs a value obtained when the predetermined reference value is subtracted from the integrated running distance, to the display means as the integrated running distance in the case where a value of the integrated running distance stored in the non-volatile memory is not less than the predetermined reference value.

The present invention provides an integrating device in which the arithmetic processing means outputs a value obtained when the predetermined reference value is subtracted from a second reference value, to the display means as the integrated running distance in the case where a value of the integrated running distance stored in the non-volatile memory becomes not less than the second reference value which is higher than the predetermined reference value.

The present invention provides an integrating method comprising the steps of: previously storing a positive value lower than a predetermined reference value in the non-volatile memory as an initial value of the integrated running distance; and outputting a value obtained when the predetermined reference value is subtracted from the integrated running distance as the integrated running distance in the case where a value of the integrated running distance stored in the nonvolatile memory is not less than the predetermined reference value.

The present invention provides an integrating method in which a value obtained when the predetermined reference value is subtracted from the second reference value is outputted as the integrated running distance in the case where a value of an integrated running distance stored in the non-volatile memory becomes not less than the second reference value higher than the predetermined reference value.

DETAILED DESCRIPTION OF THE PREFERRED EMBODIMENTS

An embodiment of the present invention will be explained below.

EMBODIMENT 1

Figure 1:
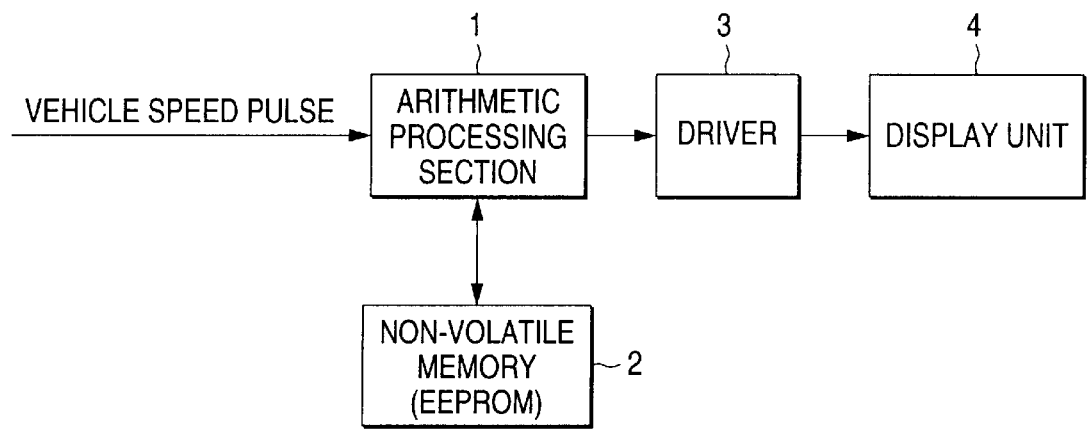
FIG. 1 is a block diagram showing an arrangement of the odometer of Embodiment 1 of the present invention.
Figures 3, 4:
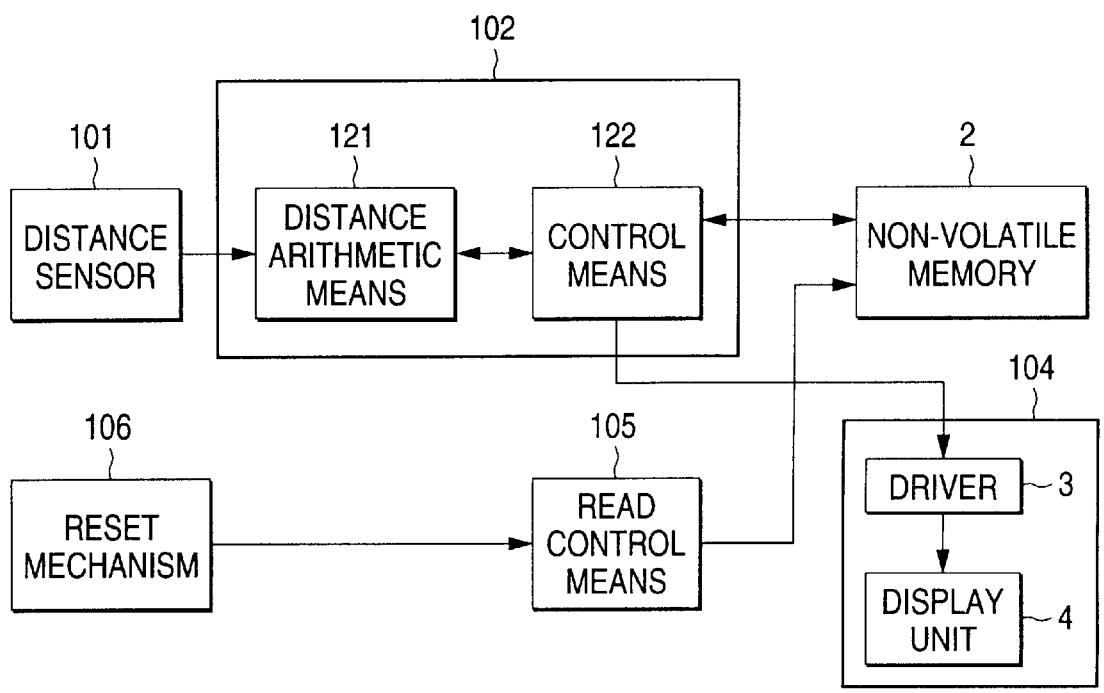
FIG. 3 is a view showing a relation between the integrated value stored in the non-volatile memory and the integrated running distance displayed on the display unit.
FIG. 4 is a block diagram showing an example of the arrangement of the conventional odometer which is an integrating device.

FIG. 1 is an arrangement view of an odometer of Embodiment 1 of the present invention. In the drawing, reference numeral 1 is an arithmetic processing section (arithmetic processing means). This arithmetic processing section operates as follows. For example, the number of pulse signals of the vehicle speed fed by the distance sensor 101 shown in FIG. 4 is counted, and a running distance corresponding to the number of the counted pulses is added to the integrated value stored in the non-volatile memory 2, so that a new integrated value is calculated, and the thus obtained integrated value is stored in the non-volatile memory 2 at each predetermined distance (for example, 1 km). Further, the arithmetic processing section 1 reads out the integrated value from the non-volatile memory 2 and calculates the integrated running distance, which is data to be displayed, by the integrated value. Then the thus calculated integrated running distance is outputted to the driver (display means) 3, so that the integrated running distance is displayed on the display unit (display means) 4.

In this connection, the arithmetic processing section 1 may be composed of logical circuit in which various logical operators are used. Alternatively, the arithmetic processing section 1 may be composed of a microcomputer having ROM, RAM and CPU.

Other components are the same as those shown in FIG. 4. Therefore, like reference characters are used to indicate like parts in the drawings, and explanations are omitted here.

Next, operation will be explained as follows.

Figure 2:
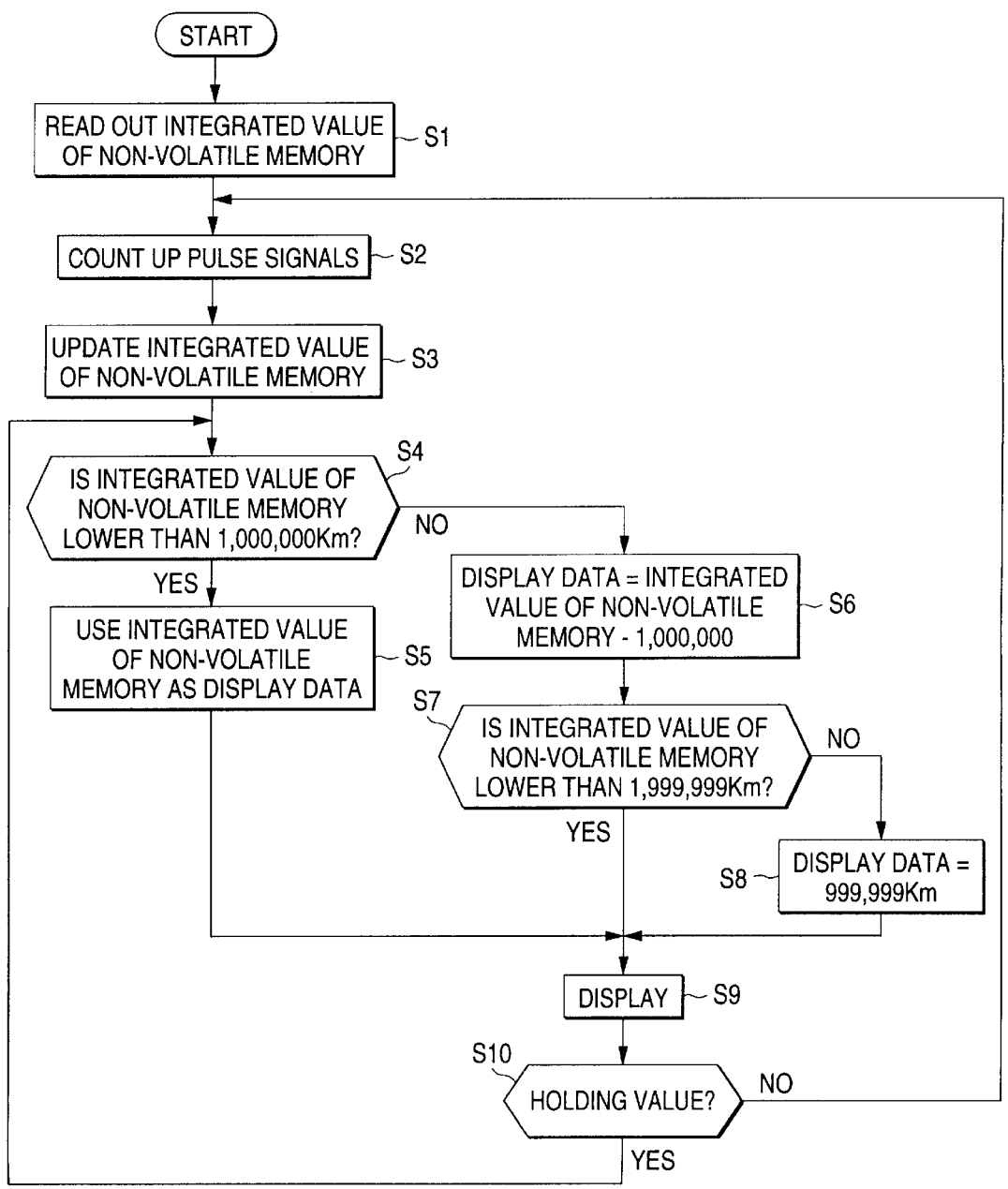
FIG. 2 is a flow chart for explaining operation of the odometer shown in FIG. 1.

FIG. 2 is a flow chart showing operation of the odometer of Embodiment 1. FIG. 3 is a view showing a relation between the integrated value stored in the non-volatile memory 2 of Embodiment 1 and the integrated running distance displayed on the display unit 4. Referring to the flow chart shown in FIG. 2, operation of the odometer of Embodiment 1 will be explained as follows.

First, when an ignition switch (not shown in the drawing) incorporated into a vehicle is turned on, electrical power is supplied to the device. Then, the arithmetic processing section 1 reads out an integrated value from the non-volatile memory 2 in step S1. In step S2, a distance corresponding to a pulse signal fed from the distance sensor 101 is successively added to the integrated value.

In this connection, this integrated value is either an initial value of the previously stored integrated value or an integrated value finally stored by the arithmetic processing section 1. The initial value of the integrated value, which is a value to be set when the odometer is manufactured, is previously set at a positive value lower than a predetermined reference value described later.

After the number of pulse signals corresponding to a predetermined distance, which is 1 km in this case, has been counted, the program proceeds to step S3, and the arithmetic processing section 1 makes the non-volatile memory 2 store a value obtained when 1 is added to the integrated value stored in the non-volatile memory 2 as a new integrated value.

Next, in step S4, the arithmetic processing section 1 reads out the integrated value from non-volatile memory 2, and it is judged whether or not the value is lower than 1,000,000 (predetermined reference value). When it is judged that the integrated value is lower than 1,000,000, the program proceeds to step S5, and the display data is set at the same value as the integrated value.

On the other hand, when it is judged in step S4 that the integrated value is not lower than 1,000,000, that is, when it is judged in step S4 that the integrated value is not less than 1,000,000, the program proceeds to step S6, and the arithmetic processing section 1 sets the display data at a value obtained when 1,000,000 is subtracted from the integrated value which has been read out from the non-volatile memory 2.

In step S7, the arithmetic processing section 1 judges whether or not the integrated value of the non-volatile memory 2 is lower than 1,999,999 (the second reference value). When it has been judged that the integrated value of the non-volatile memory 2 is not lower than 1,999,999, that is, when the integrated value is not less than 1,999,999, a value of display data which has been set in step S6 is changed to 999,999 in step S8. That is, in step S8, the arithmetic processing section 1 sets the display data for displaying a value obtained by subtracting a predetermined reference value from the second reference value as the integrated running distance.

On the other hand, when it has been judged in step S7 that the integrated value is lower than 1,999,999, the value of display data is not changed. That is, in this case, the value of display data is held at a value which has been set in step S6.

As described above, in steps S4 to S8, the arithmetic processing section 1 sets the display data in the following manner. When the integrated value stored in the non-volatile memory 2 is 0 to 999,999 as shown in FIG. 3, the arithmetic processing section 1 sets the display data at the same value as the integrated value. When the integrated value is 1,000,000 to 1,999,999, the arithmetic processing section 1 sets the display data at a value obtained when 1,000,000 is subtracted from the integrated value. When the integrated value is not less than 1,999,999, the arithmetic processing section 1 sets the display data at 999,999 (=1,999,999−1,000,000).

Next, the program proceeds to step S9, and the arithmetic processing section 1 outputs the display data, which has been set in either of steps S5, S6 and S8, to the driver 3. When the driver 3 receives the display data, an integrated running distance corresponding to the display data is displayed on the display unit 4. That is, a value of the display data is displayed on the display unit 4 as the integrated running distance.

Further, the program proceeds to step S10, and the arithmetic processing section 1 judges whether or not the value of the display data is a holding value (the value of the display data corresponding to the second reference value). In this case, since the holding value is 999,999 (=1,999,999−1,000, 000), it is judged whether or not the value of the display data is 999,999. When it has been judged that the value of the display data is not 999,999, the program returns to step S2, and the number of pulses is counted up again and the integrated value is updated.

On the other hand, when it is judged in step S10 that the value of the display data is 999,999, it is unnecessary to further update the integrated value. Therefore, the program returns to step S4. In this case, processing of steps S4, S6, S7, S8, S9 and S10 is repeatedly conducted, and 999,999 (km), which is a holding value, continues to be displayed on the display unit 4.

Due to the foregoing, when the initial value of the integrated value of the non-volatile memory 2 is set, for example, at 999,970 and 30 (1,000,000−999,970) is counted in the test running, it becomes possible to display 0 (km) on the display unit 4 when the vehicle is delivered to a user. In this case, the integrated value stored in the non-volatile memory 2 is 1,000,000.

In this connection, in Embodiment 1 described above, in the case where the integrated value stored in the non-volatile memory 2 is increased to a value not less than 1,000,000, a value obtained when 1,000,000 is subtracted from the integrated value is used as the display data. However, it should be noted that this reference value is not limited to 1,000,000, but other values may be used. In the same manner, the second reference value is set at 1,999,999 in Embodiment 1, however, the second reference value is not limited to the above specific value.

When these reference values are set, the arithmetic processing section 1 may be previously composed so that the reference values can become predetermined values. Alternatively, the reference values may be previously stored in the non-volatile memory 2, so that the arithmetic processing section can read out the values so as to use the values.

Also, in Embodiment 1, the unit of the running distance is kilometer. However, the unit of the running distance may be other units, for example, the unit of the running distance may be mile. In this case, the arithmetic processing section 1 may be composed in such a manner that the integrated value is increased and updated by 1 each time the vehicle runs by the unit distance.

As described above, according to this embodiment, the non-volatile memory 2 stores a value lower than the predetermined reference value (1,000,000 in this case) as an initial value of the integrated value, and when an integrated value stored in the non-volatile memory 2 is not less than this reference value, a value obtained when the reference value is subtracted from the integrated value stored in the non-volatile memory 2 is displayed as an integrated running distance. In other words, when the integrated value is equal to the reference value, zero is displayed as the integrated running distance. Due to the foregoing, it is unnecessary to provide a resetting function by which the integrated running distance is reset after the completion of various tests. That is, the integrated running distances corresponding to various tests are not counted up without providing a resetting function. Further, it is possible to suppress conducting an unfair operation, and it becomes possible to find out a precise running distance.

When the integrated value stored in the non-volatile memory 2 reaches the previously set second reference value (1,999,999 in this case), the displayed integrated running distance is fixed at a value obtained when a predetermined reference value is subtracted from the second reference value. Therefore, it is possible to suppress an unfair operation in which the integrated running distance is made to reach the predetermined maximum value again so that the integrated running distance can be returned to zero.

As described above, according to the present invention, a positive value lower than the predetermined reference value is previously stored in the predetermined non-volatile memory as an initial value of the integrated running distance, and when a value of the integrated running distance stored in the non-volatile memory is not less than the predetermined reference value, a value obtained when the predetermined reference value is subtracted from the integrated running distance is outputted as the integrated running distance. Due to the foregoing, it is unnecessary to provide a resetting function by which the integrated running distance is reset after the completion of various tests. That is, the integrated running distances corresponding to various tests are not counted up without providing a resetting function. Further, it is possible to suppress conducting an unfair operation, and it becomes possible to find out a precise running distance.

According to the present invention, when a value of the integrated running distance stored in the non-volatile memory is not less than the second reference value which is higher than the predetermined reference value, a value obtained when the predetermined reference value is subtracted from the second reference value is displayed as an integrated running distance. Therefore, when an integrated value stored in the non-volatile memory 2 reaches the second reference value, the integrated running distance to be displayed is fixed at a value obtained when the predetermined reference value is subtracted from the second reference value. Therefore, it is possible to suppress an unfair operation in which the integrated running distance is made to reach the predetermined maximum value again so that the integrated running distance can be returned to zero.

What is claimed is:

1. An integrating device comprising:
    a non-volatile memory for storing a value of an integrated running distance of a vehicle;
    an arithmetic processing means for calculating a new integrated running distance by a signal generated at each predetermined running distance and also by the integrated running distance stored in the non-volatile memory; and
    a display means for displaying the integrated running distance;
        wherein the non-volatile memory stores a positive value lower than a predetermined reference value as an initial value of the integrated running distance, and the arithmetic processing means outputs a value obtained when the predetermined reference value is subtracted from the integrated running distance, to the display means as the integrated running distance in the case where a value of the integrated running distance stored in the non-volatile memory is not less than the predetermined reference value.

2. An integrating device according to claim 1, wherein the arithmetic processing means outputs a value obtained when the predetermined reference value is subtracted from a second reference value, to the display means as the integrated running distance in the case where a value of the integrated running distance stored in the non-volatile memory becomes not less than the second reference value which is higher than the predetermined reference value.

3. An integrating method for calculating and outputting a new integrated running distance by a value of an integrated running distance of a vehicle stored in a predetermined non-volatile memory and also by a signal generated at each predetermined running distance, the integrating method comprising the steps of:
    previously storing a positive value lower than a predetermined reference value in the non-volatile memory as an initial value of the integrated running distance; and
    outputting a value obtained when the predetermined reference value is subtracted from the integrated running distance as the integrated running distance in the case where a value of the integrated running distance stored in the non-volatile memory is not less than the predetermined reference value.

4. An integrating method according to claim 3, wherein a value obtained when the predetermined reference value is subtracted from the second reference value is outputted as the integrated running distance in the case where a value of the integrated running distance stored in the non-volatile memory becomes not less than the second reference value higher than the predetermined reference value.

* * * * *